(12) United States Patent
Wiedemann

(10) Patent No.: US 10,640,966 B2
(45) Date of Patent: May 5, 2020

(54) SEWER CLEANING DEVICE

(71) Applicant: Karl Wiedemann, Welden (DE)

(72) Inventor: Karl Wiedemann, Welden (DE)

( * ) Notice: Subject to any disclaimer, the term of this patent is extended or adjusted under 35 U.S.C. 154(b) by 236 days.

(21) Appl. No.: 15/497,737

(22) Filed: Apr. 26, 2017

(65) Prior Publication Data

US 2017/0342700 A1 Nov. 30, 2017

(30) Foreign Application Priority Data

May 25, 2016 (DE) .......................... 10 2016 006 275

(51) Int. Cl.
*E03F 7/10* (2006.01)
*B65H 51/12* (2006.01)
(Continued)

(52) U.S. Cl.
CPC .............. *E03F 7/106* (2013.01); *B65H 51/12* (2013.01); *B65H 57/14* (2013.01); *B65H 75/265* (2013.01);
(Continued)

(58) Field of Classification Search
CPC ... E03F 9/00; E03F 9/002; E03F 9/005; E03F 9/007; E03F 7/106; E03F 7/166; B65H 75/265; B65H 75/425; B65H 57/14; B65H 51/12; B65H 7/14; B65H 5/425; B65H 2701/33; B65H 75/403; F04B 9/00; F04B 1/145; F04B 1/146; F04B 1/295; F04B 1/123; F16H 39/00; F16H 39/12; F16H 47/02; F15B 18/00; B60P 3/225; B60R 3/2265
(Continued)

(56) References Cited

U.S. PATENT DOCUMENTS 1,803,425 A * 5/1931 Cunningham ............ E03F 9/00
15/104.31
3,683,749 A * 8/1972 Bayles .................... B64C 13/24
91/438

FOREIGN PATENT DOCUMENTS

| AT | 403712 B | 5/1998 |
| DE | 3813419 A1 | 11/1989 |

(Continued)

OTHER PUBLICATIONS

McMaster-Carr Supply Company Catalog 105—Hydraulic Motors, displacement rate (Year: 1999).*
(Continued)

*Primary Examiner* — Orlando E Aviles
*Assistant Examiner* — Robert F Neibaur
(74) *Attorney, Agent, or Firm* — Falk Ewers; Ewers IP Law PLLC

(57) ABSTRACT

A sewer cleaning device has a rinsing hose, to which pressurized water is applied, which is stored on an assigned storage reel and which passes through a transportation apparatus adjacent to the storage reel. A manner of operating, which protects the rinsing hose, is achieved by providing a reel arrangement, around which the rinsing hose is wrapped at least once, having two redirection reels arranged laterally adjacent to one another in the radial direction, which are offset in relation to one another in the axial direction by at least the thickness of the rinsing hose and of which at least one redirection reel is arranged tilted about an axis of symmetry, which perpendicularly intersects the axes of the two redirection reels, so that during each complete wrap around the reel arrangement forming the transportation apparatus by the rinsing hose, a pitch of the path assigned to the rinsing hose results.

15 Claims, 3 Drawing Sheets

(51) Int. Cl.
*B65H 57/14* (2006.01)
*B65H 75/26* (2006.01)
*B65H 75/42* (2006.01)
*B60P 3/22* (2006.01)

(52) U.S. Cl.
CPC ............ B65H 75/425 (2013.01); *B60P 3/225* (2013.01); *B60P 3/2265* (2013.01); *B65H 2701/33* (2013.01)

(58) Field of Classification Search
USPC .... 134/167, 24, 26, 268, 269, 172; 118/317, 118/323, 600; 15/340.1; 242/557
See application file for complete search history.

(56) References Cited

FOREIGN PATENT DOCUMENTS

| | | | | | |
|---|---|---|---|---|---|
| DE | 19611107 | A1 | * | 9/1997 | ................ E03F 7/10 |
| EP | 0698696 | A1 | * | 2/1996 | ................ E03F 7/10 |
| EP | 1847658 | A1 | * | 10/2007 | ................ E03F 7/10 |
| EP | 2295656 | A1 | * | 3/2011 | ................ E03F 7/10 |
| EP | 2458099 | A1 | * | 5/2012 | ................ E03F 7/10 |
| GB | 138073 | | * | 1/1920 | |
| GB | 0138073 | | * | 1/1920 | |
| GB | 0138073 | | * | 7/1921 | ................ E03F 7/10 |
| GB | 673375 | | * | 5/1950 | |
| GB | 0673375 | | * | 5/1950 | |
| WO | WO-2016042071 | A1 | * | 3/2016 | ............. B63B 35/03 |

OTHER PUBLICATIONS

McMaster-Carr, Hydraulic motors, 1999 105 catalog (Year: 1999).*
U.S. Appl. No. 15/497,686, filed Apr. 26, 2017, Karl Wiedemann.

* cited by examiner

SEWER CLEANING DEVICE

CROSS REFERENCE TO RELATED APPLICATIONS

This application claims priority from German patent application DE 10 2016 006 275.4, filed May 25, 2016, the entire content of which is incorporated herein by reference.

TECHNICAL FIELD

The invention relates to a sewer cleaning device having a rinsing hose, to which pressurized water can be applied, and which is storable on an assigned storage reel and passes through a transportation apparatus adjacent to the storage reel, which has a reel arrangement wrapped around at least once by the rinsing hose.

BACKGROUND

DE 38 13 419 A1 discloses a sewer cleaning device having a transportation apparatus adjacent to the storage reel. It consists of two transportation rollers which can be pressed against one another, between which the rinsing hose is guided through. Using a transportation apparatus of this type, however, only comparatively small traction forces can be transmitted to the rinsing hose. Accordingly, the known transportation apparatus is only used for drawing off the rinsing hose from the storage drum. The known transportation apparatus is not suitable fox retracting the rinsing hose from the sewer. This is because a high traction force is required for retracting the rinsing hose from the sewer, which cannot be transmitted to the rinsing hose using two transportation, rollers which, can be pressed against the hose. This is because it is to be presumed in this context that the rinsing hose is equipped at its front end with a sewer nozzle, which is provided with reverse jet nozzles and generally has to be withdrawn from the sewer against the recoil action of the water jets emitted from the reverse jet nozzles. In the known arrangement, the rinsing hose is therefore withdrawn from the sewer by a corresponding drive of the storage drain and in this case wound simultaneously on to the storage drum. However, the risk exists in this case that the rinsing hose, which is running onto the storage drum and is drawn thereby, will be drawn, in the case of a gap caused by the diameter differences of the rinsing hose between two turns of the rinsing hose winding, as a result of the high traction force engaging on the rinsing hose into such a gap and will be pinched therein, so that the rinsing hose does not run off of the storage reel during the subsequent unwinding at the pinched point but rather is carried along thereby in the unwinding direction, which necessarily has the result that the rinsing hose will be buckled and thus damaged, which is undesirable for economic reasons.

AT 403 712 B discloses a sewer cleaning device having a transportation apparatus associated with the storage reel, which consists of an additional redirection reel, which is arranged at a distance from the storage reel on the vehicle rear. As a result, when the suction hose coming from the storage reel runs on to the redirection reel a strong redirection results, which can result in a high level of strain and malfunctions. In addition, in an arrangement having only one redirection reel to achieve a comparatively high fraction force, a comparatively large number of wraps around is necessary, whereby the same problems as in the storage reel according to DE 38 13 419 A1 can result at the redirection reel.

SUMMARY

It is therefore an object of the present invention to improve an arrangement of the type mentioned at the outset using simple and cost-effective means, so that a manner of operating which protects the rinsing hose is possible.

This object is achieved in that the reel arrangement which forms the transportation apparatus has two redirection reels, which are arranged laterally adjacent to one another with axial offset in the radial direction, and which are offset in relation to one another in the direction of the rotational axis thereof by at least the thickness of the rinsing hose and of which at least one redirection reel is arranged tilted about an axis of symmetry, which intersects the axes of the two redirection reels perpendicularly, such that in each complete wrap around the reel arrangement forming the transportation apparatus by the rinsing hose, a pitch of the path assigned to the rinsing hose which corresponds to the axial offset of the two redirection reels results.

With the aid of the two redirection reels of the reel arrangement, which forms the transportation apparatus and around which the rinsing hose is wrapped, a high traction force can be transmitted to the rinsing hose. The rinsing hose can therefore be readily retracted without participation of the storage reel by the transportation apparatus according to an aspect of the invention. The winding of the rinsing hose released from the transportation apparatus onto the storage reel can therefore take place under comparatively low tension, whereby the risk of pinching of the rinsing hose is avoided. As a consequence of the axial offset of the two redirection reels, it is ensured that the rinsing hose section running into the transportation apparatus can initially be guided through below a first redirection reel before it runs on to the second redirection reel, and that the rinsing hose running out of the transportation apparatus, vice versa, after exiting from the second redirection reel, can be guided via the adjacent first redirection reel, which enables a compact construction. As a consequence of the proposed tilt of at least one redirection reel, the axial offset of the two redirection reels is compensated for and therefore a substantially linear course of the rinsing hose between the two redirection reels, i.e., a substantially linear extension of the rinsing hose dining the transfer from one redirection reel to the adjacent redirection reel is achieved. The rinsing hose therefore does not collide with the flanges of the redirection reels during the transfer from one redirection reel to the adjacent redirection reel, whereby the rinsing hose is further protected. Using the measures according to the various aspects of the invention, the disadvantages of the known arrangement may therefore be completely a voided. The invention therefore results in outstanding cost-effectiveness.

Advantageous exemplary embodiments and expedient refinements of the primary measures are specified in the dependent claims.

Advantageously, both redirection reels can be arranged tilted in opposite directions about the axis of symmetry which perpendicularly intersects the axes of the two redirection reels, wherein a pitch corresponding to half of the axial offset of the two redirection reels results respectively in the region between intake and outlet of the rinsing hose onto or from the respective redirection reel. In total a pitch corresponding to the axial offset of the two redirection reels thus results upon each wrap around the transportation apparatus. Comparatively small tilt angles are already advantageously sufficient in this case, so that a particularly compact construction is achievable.

A further advantageous measure can be that the reel arrangement forming the transportation apparatus has the rinsing hose wrapped around it multiple times, preferably two times, wherein the redirection reels each, have multiple, preferably two circumferential grooves, which are delimited by lateral flanges arranged parallel in succession in the axial direction, for guiding the rinsing hose. A total wrap-around of 360° results for the transportation apparatus in the case of one circumferential, groove per redirection reel By increasing the number of the circumferential grooves, the total wrap-around can be increased and therefore the transmittable traction force can be increased. This advantage may also be strengthened in that the base of the circumferential grooves is provided with a preferably toothed surface structure, which increases the pickup of the rinsing hose resting thereon.

In a further exemplary embodiment, the storage reel and the redirection reels of the transportation apparatus can be drivable by hydraulic motors, which are connected in parallel during the retraction of the rinsing hose from the sewer, wherein the hydraulic motor assigned to the storage drum has a smaller displacement volume than the hydraulic motors assigned to the redirection reels. It is ensured in this way that the traction force required for retracting the rinsing hose from the sewer is applied by the transportation apparatus, and that the storage drum only exerts a small traction force on the rinsing hose released from the transportation apparatus during the retraction of the rinsing hose, so that it is wound onto the storage reel tautly, but without great tension.

During the unwinding of the rinsing hose, the redirection reels of the transportation apparatus are expediently driven in the unwinding direction and the storage reel is braked so that the rinsing hose is withdrawn in stretched form therefrom. For this purpose, the drive unit of the storage reel can expediently be provided with a pressure reducing valve, which is activated during the unwinding procedure and generates a braking action, which is overcome by the transportation apparatus.

In a further exemplary embodiment, the redirection reels of the transportation apparatus and preferably also the storage reel can be arranged with standing axis and recumbent turns. This results in a flat construction and facilitates the accommodation of the storage reel and the transportation apparatus on a boom, which is pivotable about a standing axis, on which a suction hose, which can also be lowered into the sewer, can be accommodated together with the assigned accommodation reel.

BRIEF DESCRIPTION OF THE DRAWINGS

The invention will now be described with reference to the drawings wherein.

DESCRIPTION OF EXEMPLARY EMBODIMENTS

The main area of application of the present invention are vehicles having a structure designed as a sewer cleaning device, i.e., so-called sewer cleaning vehicles, the fundamental structure and mode of operation of which are known.

Figure 1:
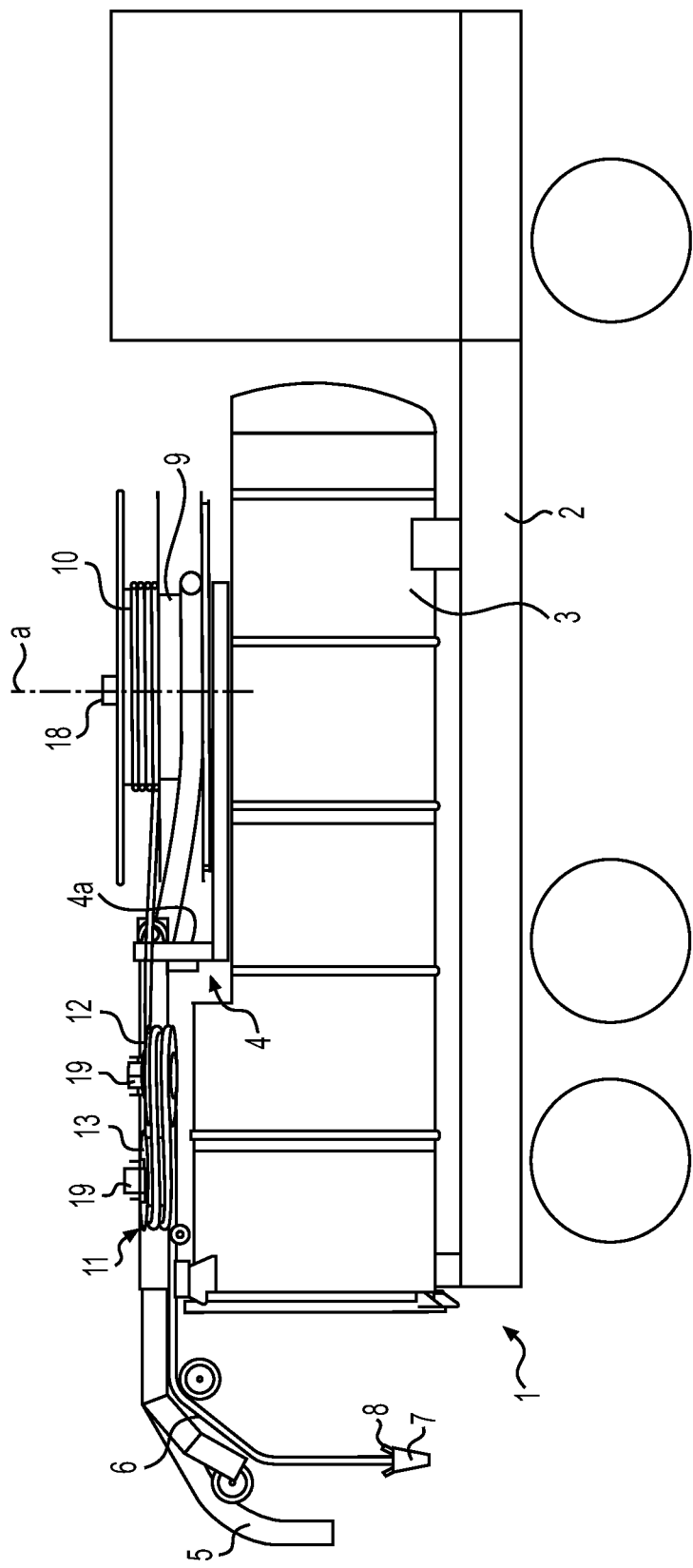
FIG. 1 shows a schematic illustration of a sewer cleaning vehicle according to an exemplary embodiment of the invention.

The sewer cleaning vehicle 1 shown in FIG. 1 contains a preferably barrel-shaped container 3, which is accommodated on a chassis 2, having chambers (not indicated in greater detail) for the water required for sewer cleaning and the sludge, which arises during the sewer cleaning and is suctioned out of the sewer. A boom 4, which is rotatable about a standing axis a, is accommodated on the container 3, via which boom a suction hose 5, which can be lowered in the sewer and to which suction traction, can be applied using a vacuum source (not shown in greater detail), and also a rinsing hose 6, which is insertable into the sewer and to which high-pressure water can be applied, run. For this purpose, the boom 4 can be oriented downward at the rear end like a snout. To enlarge the action radios, the boom 4 can be designed as telescopically extensible. The rinsing hose 6 is equipped at its hoot end with a so-called sewer nozzle 7, which is provided with reverse jet nozzles 8, which cause a recoil which draws the rinsing hose 6 into the sewer.

The suction hose 5 can be wound here onto an assigned suction hose reel 9, which is accommodated on the boom 4 with a standing axis coaxial to the axis a of the boom 4 and recumbent turns. To store the rinsing hose 6, to which high-pressure water can be applied by a high-pressure pump (not shown in greater detail), a storage reel 10 accommodated on the sewer cleaning vehicle 1 is provided. Adjacent to the storage reel 10, a transportation apparatus 11 is located, through which the rinsing hose 6 passes and which is primarily used to transmit the traction force required for retracting the rinsing hose 6 from the sewer to the rinsing hose 6.

The transportation apparatus 11 consists of a reel arrangement having two redirection reels 12, 13, which are arranged adjacent to one another with axial offset in the radial direction. The storage reel 10 and the two redirection reels 12, 13 are also assigned to the boom 4 here and, to enable a flat construction, expediently also arranged with standing axis and recumbent turns. The suction hose reel 9 can expediently rest on the boom 4. The storage reel 10 can advantageously be arranged on the suction hose reel 9 to form a reel packet. To limit the overall height, the boom 4 is provided with a step 4a, so that a niche assigned to the mentioned reel packet results. The barrel-shaped container 3 is expediently provided with an upper flattening, which is assigned to the step 4a of the boom 4 and which forms a niche for the stepped, front region of the boom 4. The redirection reels 12, 13 are attached here on one side of the boom 4, expediently on the section of the boom 4 adjoining the step 4a to the rear.

The two redirection reels 12, 13 of the transportation apparatus 11 are offset in relation to one another in the axial direct ion by at least the diameter of the rinsing hose 6, to which high-pressure water can be applied, so that it is possible to travel below the higher-positioned redirection reel 13 with the rinsing hose section 6a running onto the lower-positioned redirection reel 12 and, vice versa, to travel over the lower-positioned redirection reel 13 with the rinsing hose section 6b running off of the higher-positioned redirection reel 13. It is expedient, as indicated in FIG. 1, for the redirection reel 12 facing toward the storage reel 10 to be positioned lower and the redirection reel 13 facing toward the end of the boom 4 to be positioned higher, which enables favorable guiding of the rinsing hose 6.

Figure 2:
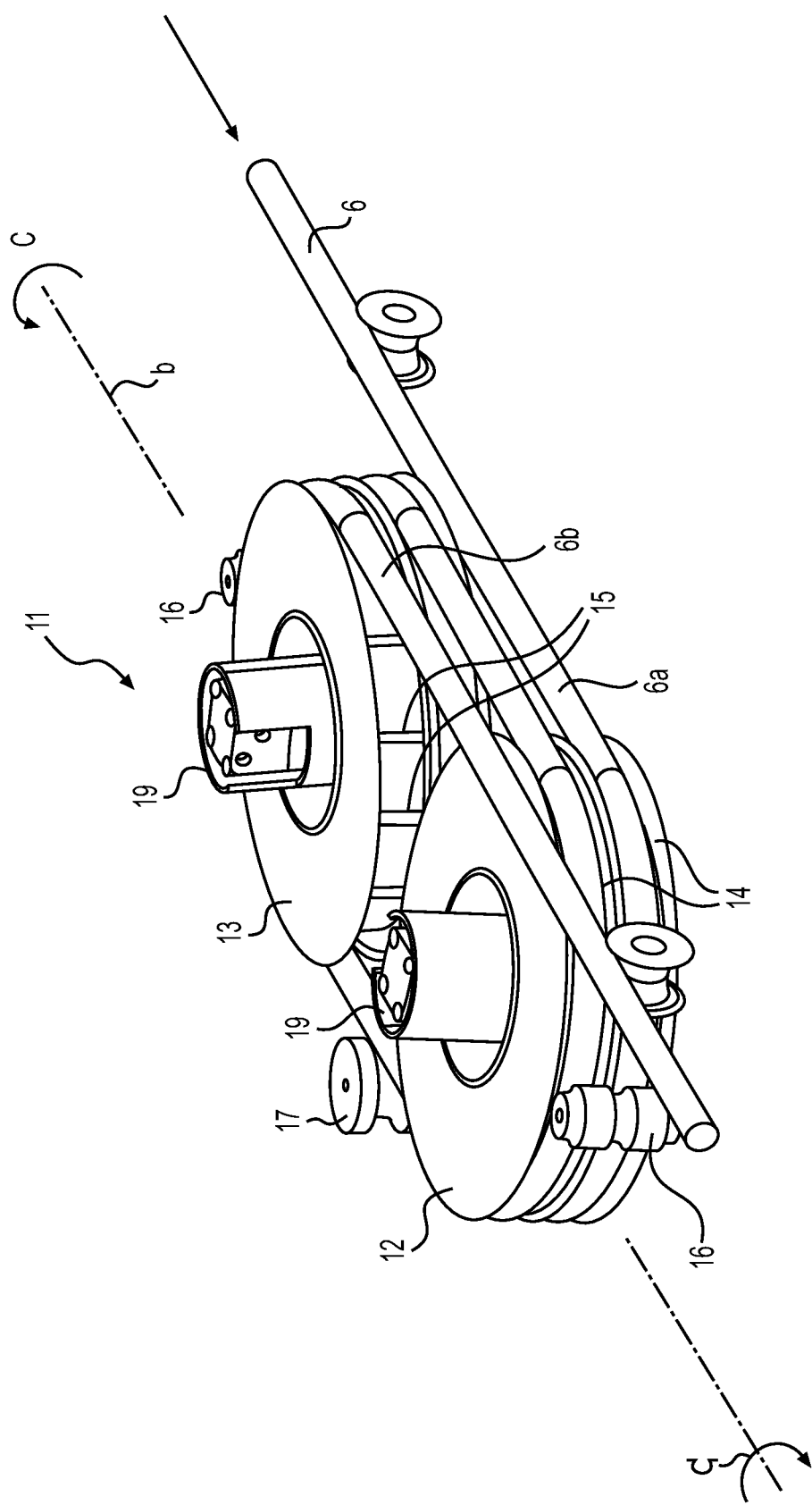
FIG. 2 shows a perspective side view of the transportation apparatus of the arrangement shown in FIG. 1 diagonally from above.
Figure 3:
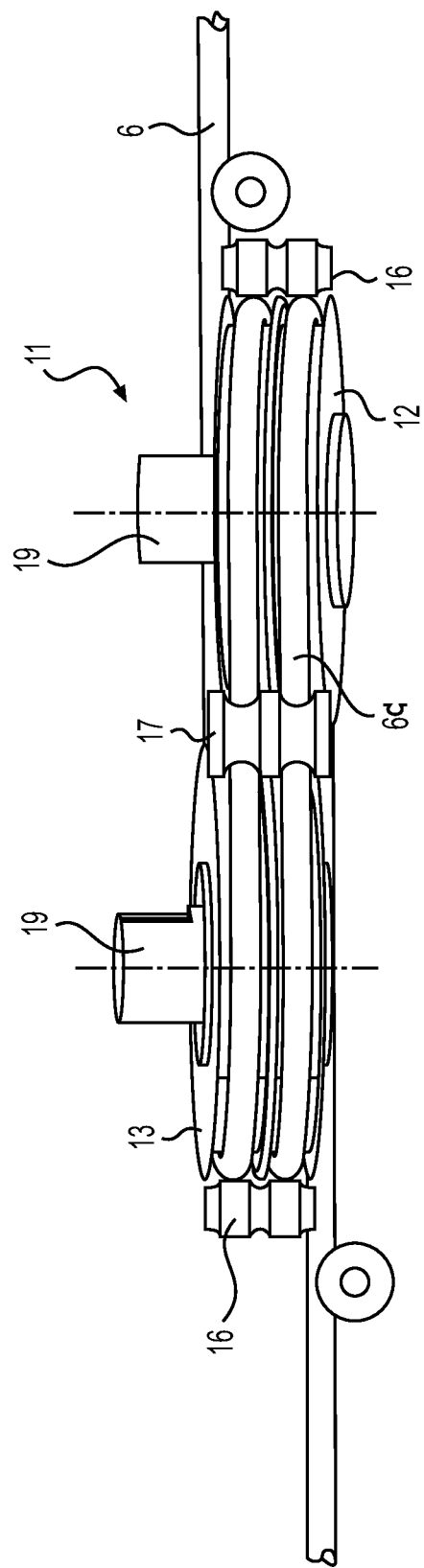
FIG. 3 shows a side view of the transportation apparatus according to an exemplary embodiment of the invention from the side opposite to the side shown in FIG. 2.

The reel arrangement which forms the transportation apparatus 11, as shown in detail in FIG. 2, is wrapped around by the rinsing hose 6 at least once, preferably multiple times. During each, wrap around the transportation apparatus 11, the two redirection reels 12, 13 of the transportation apparatus 11 are engaged in this case in the region of the circumferential regions thereof facing away from one another with the rinsing hose. In the illustrated exemplary embodiment, the two redirection reefs 12, 13 have equal diameter, so that an engagement region of 180° results in each case on each redirection reel. For each wrap around the transportation apparatus, a wraparound angle of 360° thus results, over which the rinsing hose 6 is successively engaged with the two redirection reels 12, 13. The rinsing hose 6 entering the transportation apparatus, as is apparent from FIG. 3, is guided after ending the first wrap around the first redirection reel 12 therefrom in the form of an approximately tangentially extending hose section 6c to the adjacent redirection reel 13 and after passing through the engagement region therein is either guided out of the transportation apparatus 11 or, in the case of multitrack redirection reels guided back to the first redirection reel 12 and so forth.

To ensure that the rinsing hose 6, in spite of the height offset of the two redirection reels 12, 13, can be transferred without bending on one level in each case from one redirection reel to the adjacent redirection reel, at least one line of symmetry b, which perpendicularly intersects redirection reels 12, 13 about one of the axes of the two redirection reels 12, 13, and therefore also extends in parallel to the section 6a or 6b running therefrom or thereon, of the rinsing hose 6, and is indicated by a dot-dash line in FIG. 2, is arranged tilted, as furthermore illustrated in FIG. 2 by a rotation arrow c assigned to the line of symmetry b.

The two redirection reels 12, 13 are expediently arranged tilted in opposite directions about the mentioned line of symmetry b, as shown in FIG. 2 by two opposing rotation arrows c, wherein expediently equal tilt angles are provided. The tilt angle is dimensioned in any case so that by way of the opposing fall or rise, respectively, caused in this way of one half of the redirection reels 12, 13 adjacent to one another, a compensation results of the mutual offset thereof in the axial direction, the mutual height offset here. If as in the illustrated exemplary embodiment, the two redirection reels 12, 13 are tilted toward one another in opposite directions, the tilt angle is dimensioned so that on the engagement region of 180°, i.e., between running on and running off of the rinsing hose 6 onto or from the relevant redirection reel 12 or 13, respectively, a pitch corresponding to half of the diameter of the rinsing hose 6 results, so that two successive engagement regions on the first and the second redirection reels 12, 13 and accordingly a 360° wrap around the transportation apparatus 11 formed by the two redirection reels 12, 13 result in a total pitch corresponding to the foil diameter of the rinsing hose 6. Between the lower vertex and the upper vertex of the lower-positioned redirection reel 12 and the region subsequently passed through between the lower vertex and the upper vertex of the adjacent redirection reel 13, which is tilted in the opposite direct ion the rinsing hose is guided upward here in each case by half of its diameter, and therefore as a whole by its total diameter, whereby the height offset of the redirection reels is compensated for.

If only one redirection reel is tilted, the tilt angle has to be selected so that a pitch corresponding to the foil diameter of the rinsing hose 6 results on the engagement region of the tilted redirection reel, because the adjacent redirection reel revolves at the same level on the entire circumference, i.e., does not provide any contribution to the pitch. In any case, the tilt angle has to be dimensioned so that the total pitch of the engagement regions passed through successively on the two redirection reels and accordingly a foil wrap around the reel arrangement forming the transportation apparatus 11 result in a total pitch corresponding to the axial offset of the redirection reels 12, 13 and therefore the diameter of the rinsing hose 6 here.

The redirection reels 12, 13 are provided with peripheral circumferential grooves 14, which are identified in FIG. 2, for guiding the respective accommodated rinsing coil section. In the illustrated exemplary embodiment, the redirection reels 12, 13 are each provided with two circumferential grooves 14. More or fewer would be conceivable. The more parallel circumferential grooves 14 are provided, the more often the redirection reels 12, 13 are engaged with the rinsing coil 6 on the provided engagement region and accordingly the greater is the total wraparound angle and accordingly the transmittable force.

As a result of the arrangement tilted in opposite directions of the redirection reels 12, 13, the upwardly-tilted half of one redirection reel 12 is located with respect to the line of symmetry b on the same side as the downwardly-tilted half of the other redirection reel 13. As shown in FIG. 3, m this manner, on the respective side of the two redirection reels 12, 13 facing away from the intake or outlet of the transportation apparatus 11, which is shown in FIG. 3, the circumferential grooves 14 of the upwardly-tilted half of one redirection reel 12 are located on the same level as the circumferential grooves 14 of the downwardly-tilted half of the other redirection reel 13. The rinsing hose 6 is accordingly transferred at the same level horn the redirection reel 12 to the following redirection reel 13 and therefore has a linear, axially-normal extension between the two redirection reels. This also applies, of course, as shown in FIG. 2, to the transfer of the rinsing coil 6 from the lower circumferential groove 14 of the upwardly-tiled half of the higher-positioned redirection reel 13 to the second circumferential groove 14 of the downwardly-tilted half of the lower-positioned redirection reel 12.

The rinsing hose 6, which is retracted from the right from the sewer shown in FIG. 2 is firstly guided through below the upwardly-tilted half of the higher-positioned redirection reel 13 facing toward the rear end of the boom 4, and then runs in the region of the downwardly tilted half of the redirection reel 13 facing toward the storage reel 10 into the lower redirection groove 14 thereof. As a result of the tilted arrangement, this groove rises in the adjoining engagement region, which extends over an angle of 180°, from its lowest level, which is shown at the front in FIG. 2, to its diametrically opposite highest level, which is shown in the front in FIG. 3, where the rinsing hose 6 runs off of the redirection reel 12 and is guided to the adjacent, higher-positioned redirection reel 13. Because this redirection reel is arranged tilted in the opposite direction to the redirection reel 12, its downwardly-tilted half is located in the running direction of the rinsing hose 6 adjacent to the upwardly-tilted half of the redirection drum 12, as clearly shown in FIG. 3.

By way of the selection of the suitable tilt angle, in this manner the axial offset of the two redirection reels 12, 13 is compensated for, so that the upper vertex, which appears in FIG. 3, of the lower circumferential groove 14 of the lower-positioned redirection reel 12, at which the rinsing hose 6 runs off therefrom, and the lower vertex of the lower circumferential groove of the redirection reel 13 tilted in the opposite direction, at which the rinsing hose 6 leaving the redirection reel 12 runs onto the adjacent redirection reel 13, are arranged at the same level i.e., in a coplanar manner. This continues, as is apparent from FIG. 2, in a reverse manner on the opposite side when the rinsing hose reaches the second circumferential groove 14 of the downwardly-tilted half of the adjacent redirection reel 12 from the lower circumferential groove of the upwardly-tilted half of the redirection reel 13, etc. After the rinsing hose 6 has wrapped around reel arrangement forming the transportation apparatus 11 one time or multiple times, depending on the number of the provided circumferential grooves 14, in the illustrated example two times, and runs off of the higher-positioned redirection reel 13 at the upper vertex of the upwardly-tilted half thereof it is guided via the downwardly-tilted half of the adjacent redirection reel 12 to the storage reel 10.

In general, by way of the tilted arrangement of at least one redirection reel and/or the arrangement tilted in opposite direction of both redirection reels 12, 13, in spite of the mutual offset in the axial direction, in the illustrated exemplary embodiment in spite of the mutual height offset, of the two redirection reels 12, 13, the vertexes of the circumferential grooves 14, at which the rinsing hose 6 runs off irons one redirection reel and subsequently runs onto the adjacent redirection reel are located in one plane and are accordingly at the same level, so that the rinsing hose 6 can run off or on, respectively, in a straight line, whereby shearing at the lateral boundaries of the circumferential grooves 14 is avoided and therefore the rinsing hose 6 is protected.

The circumferential grooves 14 of the redirection reels 12, 13 are delimited by lateral flanges, which each protrude beyond a central drum, which forms the groove base, in the radial direction. These grooves can be provided with a surface structure 15, which is indicated in FIG. 2 and promotes the force transmission between the redirection drums 12, 13 and the rinsing hose 6 which interacts therewith. As indicated in FIG. 2, this structure can be formed in the manner of gear teeth. To further assist the force transmission between redirection reels 12, 13 and rinsing hose 6, contact pressure rollers 16 are provided, which are each assigned to the engagement region of the redirection reels 12, 13, or hold the rinsing hose 6 in the circumferential grooves 14, and press against the groove base. These rollers expediently have a peripheral collar, which enables reliable engagement in the respective assigned circumferential groove 14. Guiding element s, expediently in the form of guiding rollers 17 can be provided in the region between the two redirection reels 12, 13, which guide the rinsing hose sections extending tangentially between the two redirection reels 12, 13 and support, them against deviating outward. The guiding elements 17 therefore expediently have a peripheral notch for each rinsing hose section.

The transportation apparatus 11 formed by the two redirection reels 12, 13 transmits the traction force required during the retraction of the rinsing hose 6 to the rinsing hose 6 and in this manner, relieves the downstream storage drum 10. This drum only inns with a slight lead in this ease in relation to the transportation apparatus 11, so that the rinsing hose section, which is leaving the transportation, apparatus 11 and is released thereby, is wound exactly, i.e., tautly, but only with slight tension onto the storage reel 10.

To drive the storage reel 10 and the redirection reels 12, 13, hydraulic motors 18, 19 respectively assigned thereto are provided, which are connected in parallel, i.e., connected to a common pressure source, during the retraction of the rinsing hose 6 from the sewer. The hydraulic motor 18 assigned to the storage drain 10 has a substantially smaller displacement volume in this case than the hydraulic motors 19 assigned to the redirection drums 12, 13, which has the effect that the rinsing hose 6 released from the transportation apparatus 11 is only wound with slight tension onto the storage reel 10. During the unwinding of the rinsing hose 6 from the storage reel 10, the redirection reels 12, 13 are driven in the unwinding direction and the storage reel 10 is braked so that the rinsing hose 6 unwound therefrom extends stretched under slight tension in the region between the storage reel 10 and the transportation apparatus 11. For this purpose, the hydraulic motor 18 assigned to the storage reel 10 can have a pressure reducing valve, so that it can be used as a brake.

An exemplary embodiment of the invention is explained in greater detail above, but without a restriction being linked thereto. Rather, a variety of options is available to a person skilled hi the art to adapt the general concept of the solution according to the invention to the conditions of the individual case. Thus, it would also be conceivable, for example, to instead attach, the transportation apparatus 11 laterally on the top or bottom on the boom 4. It would also be conceivable to arrange the transportation apparatus 11 and/or the storage reel 10 with horizontal axis and standing turns. The number of the circumferential grooves 14 of the redirection reels 12, 13 can also be varied upward or downward, as already mentioned above.

It is understood that the foregoing description is that of the exemplary embodiments of the invention and that various changes and modifications may be made thereto without departing from the spirit and scope of the invention as defined in the appended claims.

What is claimed is:
1. A sewer cleaning device comprising:
 a storage reel;
 a transportation apparatus arranged adjacent to the storage reel; and
 a rinsing hose configured to have pressurized water flowing therethrough, which can be stored on the storage reel, and which passes through the transportation apparatus,
 wherein the transportation apparatus has a reel arrangement, around which the rinsing hose is wrapped at least once, the reel arrangement including two redirection reels arranged laterally adjacent to one another in the radial direction, which are offset in relation to one another in the axial direction by at least the thickness of the rinsing hose and of which at least one redirection reel is arranged tilted about an axis of symmetry, which perpendicularly intersects the axes of the two redirection reels, wherein a pitch, corresponding to the axial offset of the two redirection reels, results from each complete wrap around of the rinsing hose around the reel arrangement.

2. The device according to claim 1, wherein both redirection reels are arranged tilted in opposite directions about the axis of symmetry which perpendicularly intersects the axes of the two redirection reels, wherein a pitch corresponding to half of the axial offset of the two redirection reels is provided respectively in the region between running on and running off of the rinsing hose onto or from the respective redirection reel.

3. The device according to claim 1, wherein the reel arrangement forming the transportation apparatus is wrapped around by the rinsing hose at least two times, wherein the redirection reels each have at least two circumferential grooves, which are arranged in parallel one behind another in the axial direction and are delimited by lateral flanges, for guiding the rinsing hose.

4. The device according to claim 3, wherein the flanges delimiting the circumferential grooves protrude radially beyond a drum, which forms the groove base of the circumferential grooves and which has a surface structure, which increases the force transmission to the rinsing hose and are formed as teeth.

5. The device according to claim 1, wherein contact pressure elements are configured to operate with a corresponding one of the redirection reels, and are formed as contact pressure rollers, and press against the rinsing hose.

6. The device according to claim 1, wherein guiding elements, which are configured to guide the rinsing hose and are formed as guide rollers, are provided in the region of the extension of the rinsing hose between the two redirection reels.

7. The device according to claim 1, wherein the storage reel and the redirection reels are drivable by hydraulic motors, which are connected in parallel during the retraction of the rinsing hose from the sewer, wherein the hydraulic motor assigned to a storage drum and has a smaller displacement volume than the hydraulic motors assigned to the redirection reels.

8. The device according to claim 7, wherein, during the unwinding of the rinsing hose from the storage reel, the redirection reels are drivable in the unwinding direction and the storage reel is braked by an assigned pressure reducing valve.

9. The device according to claim 1, wherein at least the redirection reels of the reel arrangement forming the transportation apparatus, and also the storage reel, are each arranged with standing axis and recumbent turns.

10. The device according to claim 1, wherein at least the redirection reels of the reel arrangement forming the transportation apparatus are attached laterally to a pivotable boom.

11. The device according to claim 1, wherein the storage reel assigned to the rinsing hose and also a suction hose reel, which is assigned to a suction hose guided via the boom, are each arranged in the region of the standing pivot axis of the boom with standing axis coaxial thereto and recumbent turns.

12. The device according to claim 11, wherein the suction hose reel rests on the boom, and the storage reel assigned to the rinsing hose is placed on the suction hose reel.

13. The device according to claim 12, wherein the boom is provided with a step, which results in a niche for the reel packet formed by the suction hose reel and the storage reel.

14. The device according to claim 13, wherein the boom is rotatably mounted on a barrel-shaped container, which is flattened on at least a part of its length on top to form a niche assigned to the step of the boom.

15. The device according to claim 1, wherein the rinsing hose is equipped on its front end, which is insertable into the sewer, with a sewer nozzle provided with reverse jet nozzles, and can be retracted by the transportation apparatus against a recoil of the reverse jet nozzles, and the drive of the storage reel is relieved therefrom.

* * * * *